US012777008B2

(12) United States Patent
Korowajczuk

(10) Patent No.: US 12,777,008 B2
(45) Date of Patent: Oct. 27, 2026

(54) ELECTRONIC STAMP SYSTEM AND METHOD

(71) Applicant: Leonhard Korowajczuk, Longboat Key, FL (US)

(72) Inventor: Leonhard Korowajczuk, Longboat Key, FL (US)

( * ) Notice: Subject to any disclaimer, the term of this patent is extended or adjusted under 35 U.S.C. 154(b) by 125 days.

(21) Appl. No.: 18/889,933

(22) Filed: Sep. 19, 2024

(65) Prior Publication Data

US 2025/0097178 A1 Mar. 20, 2025

Related U.S. Application Data

(60) Provisional application No. 63/539,245, filed on Sep. 19, 2023.

(51) Int. Cl.

*H04L 51/08* (2022.01)
*G06Q 20/12* (2012.01)
*H04L 51/23* (2022.01)

(52) U.S. Cl.

CPC ........... *H04L 51/08* (2013.01); *G06Q 20/123* (2013.01); *H04L 51/23* (2022.05)

(58) Field of Classification Search

CPC ........ H04L 51/212; H04L 51/23; G06Q 20/10
See application file for complete search history.

(56) References Cited

U.S. PATENT DOCUMENTS

| | | | | |
|---|---|---|---|---|
| 8,429,083 B2 * | 4/2013 | Appelman | H04L 45/308 705/413 |
| 2003/0134621 A1 * | 7/2003 | Yabe | H04L 51/224 455/39 |
| 2006/0168019 A1 * | 7/2006 | Levy | H04L 51/23 709/206 |
| 2011/0218916 A1 * | 9/2011 | Barber | G06Q 20/10 705/44 |
| 2011/0246932 A1 * | 10/2011 | Van Roy | G06F 3/0481 715/780 |
| 2023/0052572 A1 * | 2/2023 | Sugiura | G06F 21/6218 |

* cited by examiner

*Primary Examiner* — Chirag R Patel

(74) *Attorney, Agent, or Firm* — FRESH IP PLC; Clifford D. Hyra; Aubrey Y. Chen

(57) ABSTRACT

A system includes at least one processor to receive a piece of electronic correspondence from a sender computing device, determine that the piece of electronic correspondence is sent to a recipient that requests that the piece of electronic correspondence has an electronic stamp, send a request to attach the electronic stamp to the piece of electronic correspondence to the sender computing device, receive the piece of electronic correspondence with the electronic stamp and forward the piece of electronic correspondence to the recipient, receive one of an acknowledgement and a rejection of the piece of electronic correspondence from the recipient, and return the electronic stamp to the recipient after the acknowledgement to allow the electronic stamp to be reused in a future piece of electronic correspondence.

22 Claims, 4 Drawing Sheets

ELECTRONIC STAMP SYSTEM AND METHOD

CROSS-REFERENCE TO RELATED APPLICATION

This application claims the benefit of U.S. Provisional Application No. 63/539,245 filed Sep. 19, 2023, entitled "ELECTRONIC STAMP SYSTEM AND METHOD," the entire contents of which are incorporated herein by reference.

BACKGROUND

It is extremely easy to send electronic correspondence such as emails, text messages, and social media messages to recipients that do not desire to receive the electronic correspondence. Conventionally, users have to find ways to prevent junk email or stop junk text messages. In many cases, the "solution" for recipients is to receive the messages and delete the messages. This is time consuming and presents a large waste of computational resources including processor cycles and memory to receive and store the unwanted messages.

It is with these issues in mind, among others, that various aspects of the disclosure were conceived.

SUMMARY

The present disclosure is directed to an electronic stamp system and method. The system may include a server computing device to receive a piece of electronic correspondence from a sender computing device, intercept the piece of electronic correspondence that is to be sent to a recipient, determine whether the recipient desires the electronic correspondence to include an electronic stamp, and send the piece of electronic correspondence, possibly with the electronic stamp if requested by the recipient, to a recipient computing device.

In one example, a system may include a memory storing computer-readable instructions and at least one processor to execute the instructions to receive a piece of electronic correspondence from a sender computing device, determine that the piece of electronic correspondence is sent to a recipient that requests that the piece of electronic correspondence has an electronic stamp, send a request to attach the electronic stamp to the piece of electronic correspondence to the sender computing device, receive the piece of electronic correspondence with the electronic stamp and forward the piece of electronic correspondence to the recipient, receive one of an acknowledgement and a rejection of the piece of electronic correspondence from the recipient, and return the electronic stamp to the recipient after the acknowledgement to allow the electronic stamp to be reused in a future piece of electronic correspondence.

In another example, a method may include receiving, by at least one processor, a piece of electronic correspondence from a sender computing device, determining, by the at least one processor, that the piece of electronic correspondence is sent to a recipient that requests that the piece of electronic correspondence has an electronic stamp, sending, by the at least one processor, a request to attach the electronic stamp to the piece of electronic correspondence to the sender computing device, receiving, by the at least one processor, the piece of electronic correspondence with the electronic stamp and forwarding the piece of electronic correspondence to the recipient, receiving, by the at least one processor, one of an acknowledgement and a rejection of the piece of electronic correspondence from the recipient, and returning, by the at least one processor, the electronic stamp to the recipient after the acknowledgement to allow the electronic stamp to be reused in a future piece of electronic correspondence.

In another example, a non-transitory computer-readable storage medium may have instructions stored thereon that, when executed by at least one processor cause the at least one processor to perform operations, the operations including receiving a piece of electronic correspondence from a sender computing device, determining that the piece of electronic correspondence is sent to a recipient that requests that the piece of electronic correspondence has an electronic stamp, sending a request to attach the electronic stamp to the piece of electronic correspondence to the sender computing device, receiving the piece of electronic correspondence with the electronic stamp and forwarding the piece of electronic correspondence to the recipient, receiving one of an acknowledgement and a rejection of the piece of electronic correspondence from the recipient, and returning the electronic stamp to the recipient after the acknowledgement to allow the electronic stamp to be reused in a future piece of electronic correspondence.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
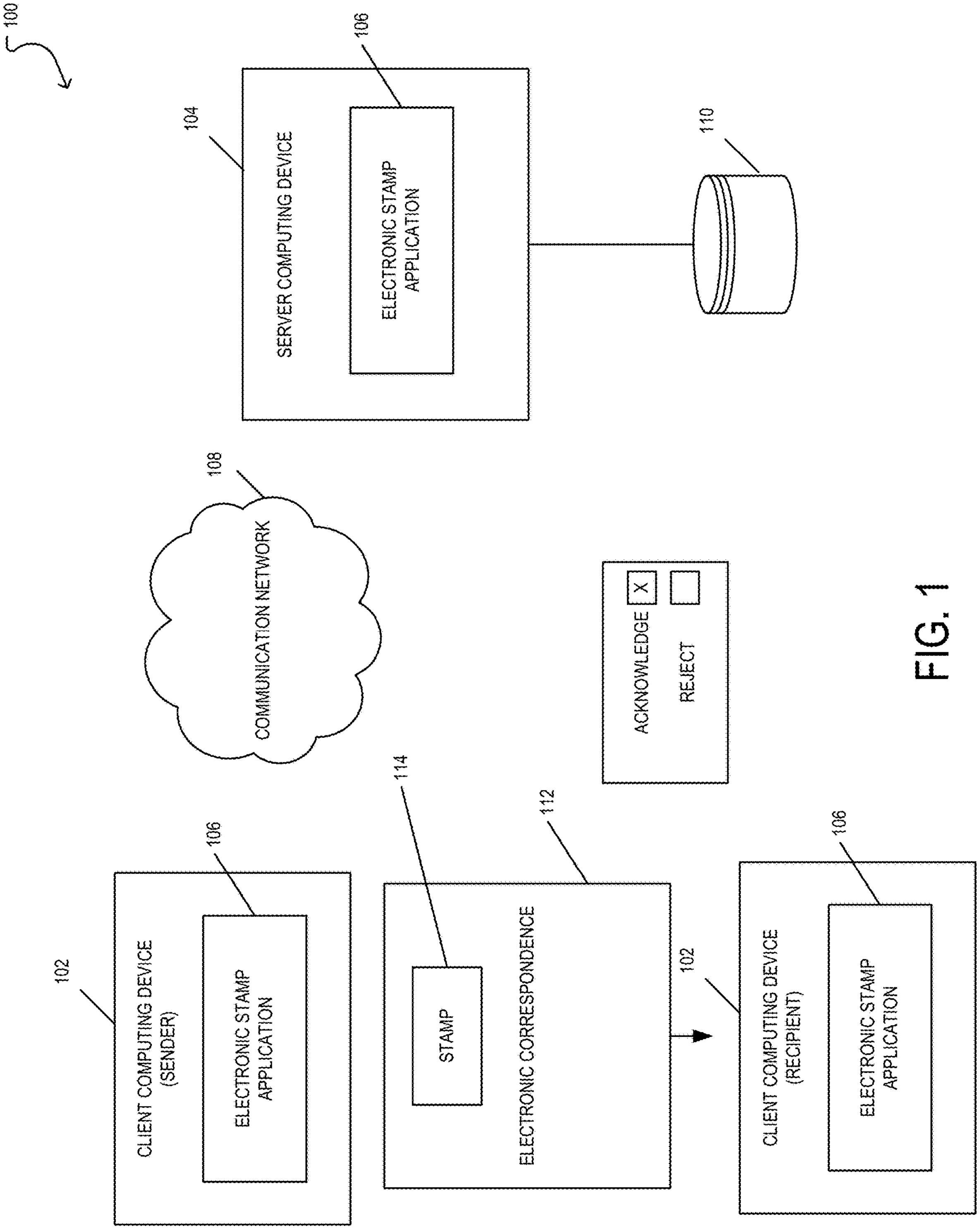
FIG. 1 shows a block diagram of an electronic stamp system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of an electronic stamp system and method includes a server computing device to receive a piece of electronic correspondence from a sender computing device, intercept the piece of electronic correspondence that is to be sent to a recipient, determine whether the recipient desires the electronic correspondence to include an electronic stamp, and send the piece of electronic correspondence, possibly with the electronic stamp if requested by the recipient, to a recipient computing device.

Unfortunately, it is extremely easy to send electronic correspondence such as emails, text messages, and social media messages to recipients that do not desire to receive the electronic correspondence. Conventionally, users have to find ways to prevent junk email or stop junk text messages. In many cases, the solution for recipients is to receive the messages and delete the messages. This is time consuming and presents a large waste of computational resources including processor cycles and memory to receive and store the unwanted messages. The electronic stamp system and method solves issues related to limiting the large waste of computational resources for recipient computing devices associated with receiving and storing the messages by a recipient computing device.

The system may limit an amount of unwanted correspondence to be received by a recipient including emails, messages, files, or another type of correspondence. As an example, the system may receive a piece of correspondence such as an email and may attach an electronic stamp (e.g., a credit) in a name of a recipient of the correspondence. If the correspondence is reciprocated (e.g., ok, thank you, acknowledged), the stamp may be canceled so that it can be reused. The system also may use cryptocurrency in lieu of the electronic stamp. As an example, the system may have an electronic stamp application that can manage transmittal and receipt of correspondence. The electronic stamp application may be incorporated into another application such as an email application, a text message application, or a social media application, among others.

In one example, a sender such as a sender computing device may send an email using the electronic stamp application, which may be incorporated into the email application. The recipient email may be received by the electronic stamp application and a reply message may be sent that indicates that an electronic stamp may be used to send the email to the recipient including information associated with a stamp value and an acceptable stamp format. The sender may add the stamp to the email. A recipient email server having the electronic stamp application may receive the email with the stamp and may send an acknowledgment after a period of time. In one example, the recipient email server may indicate that the email is accepted and delivered to the recipient for further action. The recipient may read or view the email and may keep the stamp or return the stamp. In another example, the email may be rejected and may be sent to trash. Other communications or correspondence are possible such as text messages or social media messages.

In an example, stamps may be generated and provided by companies. As an example, a first company may issue electronic stamps that can be inserted or added to correspondence. Each correspondence sender may acquire electronic stamps (e.g., electronic files) and may be billed or invoiced for the electronic stamps. Stamps can be stablecoins or cryptocurrency or tokens, among other options. When sending a piece of correspondence, a sender may insert an identification of a recipient and may attach a stamp to the correspondence. A recipient of the correspondence may acknowledge receipt of the correspondence and return the receipt to the sender. The stamp can be returned to the sender and used again by the sender. Stamps not reciprocated may be accumulated and traded at a bank or exchange, possibly for up to 100% of their original value. As a result, the system may reduce an amount of spam in email messages, text messages, and social media messages and minimize a number of legitimate email messages, text messages, and social media messages.

The method and system discussed herein can establish a cost for sending an electronic communication or correspondence such as a cost for each email that is sent to a recipient. The cost can be standardized for the entire system or can be based on a cost for each recipient and set by a recipient. Proceeds and the electronic communication may be sent to a recipient.

There are a number of example methods and ways to send an electronic stamp.

Sending actual physical currency through email may not be possible. However, it is possible to send digital representations of money electronically through various online payment platforms. These platforms allow a user to transfer money from one bank account or credit card to another person's account using email addresses, mobile numbers, or account information.

Some popular digital payment methods to be associated with the method and system include:

PayPal: A user can send money to others using their email address linked to their PayPal account.

Venmo: A mobile payment service that allows a user to send money to friends and family using their email address or phone number.

Cash App: Similar to Venmo, a user can send money to others using their email address or phone number.

Bank Transfers: Many banks offer the option to transfer money between accounts using the recipient's email address as an identifier.

Cryptocurrencies: Some cryptocurrencies can be sent via email using dedicated services or wallets.

Cryptocurrencies are typically not directly tied to a fixed amount in dollars. Their value is determined by market supply and demand dynamics. However, some stablecoins are cryptocurrencies that are designed to maintain a stable value, often pegged to a specific fiat currency like the US Dollar (USD). These stablecoins aim to provide the benefits of cryptocurrencies while minimizing the price volatility commonly associated with other cryptocurrencies like Bitcoin or Ethereum.

Examples of stablecoins pegged to the US Dollar include:

Tether (USDT): Tether is one of the most well-known stablecoins and is designed to be pegged to the US Dollar on a 1:1 basis. It is widely used in cryptocurrency trading and transactions.

USD Coin (USDC): USD Coin is another popular stablecoin that is also pegged to the US Dollar. It is backed by regulated financial institutions and is used in various applications within the cryptocurrency ecosystem.

TrueUSD (TUSD): TrueUSD is a stablecoin that is also pegged to the US Dollar and is designed to provide transparency and stability.

PAX Dollar (PAX): Pax Dollar is a stablecoin issued by Paxos and is backed by USD deposits. It is regulated and audited to ensure a 1:1 peg with the US Dollar.

These stablecoins aim to provide a more stable means of transferring value within the cryptocurrency space. However, it is important to note that even stablecoins can experience fluctuations in value due to factors like market sentiment, regulatory changes, or issues with the organizations backing them.

Another method is to use online transfer services.

Online transfer services are platforms or systems that allow a user to send money electronically from one individual or entity to another using the internet. These services provide a convenient way to transfer funds quickly, securely, and often at a lower cost compared to traditional methods like bank wires or physical checks. Some popular online transfer services include:

PayPal: One of the most well-known online payment platforms, PayPal enables users to send and receive money using email addresses or mobile numbers. It is widely used for both personal and business transactions.

Venmo: Owned by PayPal, Venmo is popular among younger users for sending money to friends and family members. It is often used for casual transactions and splitting bills.

Cash App: Developed by Square, Cash App allows users to send and receive money using their Cash App username or mobile number. It also offers other features like a Cash Card for spending and Bitcoin trading.

Zelle: A service offered by many major banks, Zelle allows users to send money directly between bank accounts using email addresses or mobile numbers. It is designed for quick transfers within the same country.

Google Pay: Integrated into Google services, Google Pay enables users to send money using email addresses or phone numbers. It also offers a digital wallet for storing payment methods and loyalty cards.

Apple Pay: Apple's payment system, Apple Pay, allows users to send money using the Messages app on iOS devices. It is linked to credit and debit cards stored in the user's Apple Wallet.

TransferWise (now Wise): Wise specializes in international money transfers with lower exchange rate markups and fees. It allows a user to send money across borders at a competitive rate.

Revolut: Revolut is a financial technology company that offers a range of services, including international money transfers, currency exchange, and a prepaid debit card.

Skrill: Skrill provides an online wallet and payment platform that allows users to send money, pay online, and manage their funds.

OFX (formerly OzForex): OFX focuses on international money transfers for individuals and businesses, offering competitive exchange rates and low fees.

These are examples of online transfer services available. Each service has its own features, fees, and geographic coverage.

Another example method includes Worm (W). An entity (bank or any financial institution) may issue a Worm in the value of the stamp. It will then keep track of its ownership.

A sender may buy a one-dollar Worm and receive a digital file. The file will contain the purchaser's identity. When sending an e-mail, the sender includes the recipient e-mail address in the file and sends it to the recipient. The recipient verifies that his ID is in the file and is presented with two options: store or return to sender. Worms can be exchanged for money in the issuing institutions.

As an example, a system may include a memory storing computer-readable instructions and at least one processor to execute the instructions to receive a piece of electronic correspondence from a sender computing device, determine that the piece of electronic correspondence is sent to a recipient that requests that the piece of electronic correspondence has an electronic stamp, send a request to attach the electronic stamp to the piece of electronic correspondence to the sender computing device, receive the piece of electronic correspondence with the electronic stamp and forward the piece of electronic correspondence to the recipient, receive one of an acknowledgement and a rejection of the piece of electronic correspondence from the recipient, and return the electronic stamp to the recipient after the acknowledgement to allow the electronic stamp to be reused in a future piece of electronic correspondence.

FIG. 1 is a block diagram of an electronic stamp system 100 according to an example of the instant disclosure. The system 100 may include at least one client computing device 102 and at least one server computing device 104. The at least one server computing device 104 may be in communication with at least one database 110. The at least one client computing device 102 may include a sender computing device and a recipient computing device.

The client computing device 102 and the server computing device 104 may have an electronic stamp application 106 that may be a component of an application and/or service executable by the at least one client computing device 102 and/or the server computing device 104. For example, the electronic stamp application 106 may be a single unit of deployable executable code or a plurality of units of deployable executable code. According to one aspect, the electronic stamp application 106 may include one component that may be a web application, a native application, and/or an application (e.g., an app) downloaded from a digital distribution application platform that allows users to browse and download applications developed with software development kits (SDKs) including the APPLE® iOS App Store and GOOGLE PLAY@, among others.

The electronic stamp application 106 may receive an electronic correspondence and intercept the electronic correspondence when it is sent from a sender computing device to a recipient computing device. The electronic stamp application 106 may determine whether a recipient desires the electronic correspondence to include an electronic stamp and determine whether the electronic correspondence includes the electronic stamp. If the electronic correspondence does not include the electronic stamp, the electronic correspondence may be returned to the sender to have the sender include the electronic stamp. If the electronic correspondence includes the electronic stamp, the electronic stamp application 106 may send the electronic correspondence to the recipient. In one example, the electronic stamp application 106 may be separate or incorporated with another application such as an email application, a texting application, or a social media application and may perform the functionality associated with intercepting the electronic correspondence.

The data stored in the at least one database 110 may be associated with the electronic stamp application 106 including stamp providers and a list of available stamps provided by stamp providers, among other information. The at least one database 110 may include a list of each stamp provider associated with the system 100 and information associated with each of the stamps provided by the stamp providers. Additionally, the at least one database 110 may include a list of recipients that request that electronic correspondence include an electronic stamp. The at least one database 110 may include a list of senders and information associated with electronic stamps for each of the senders including an account of electronic stamps for each of the senders.

FIG. 1 shows an example of a piece of electronic correspondence 112. In one example, the piece of electronic correspondence may be an email, a text message, a social media message, voice, data, and files, among others. In one example, a user such as a sender may send the piece of electronic correspondence that is received by the electronic stamp application 106. The electronic stamp application 106 may indicate that the user or sender is to add an electronic stamp 114 to the piece of electronic correspondence so that it may be sent to the recipient. The sender may add the electronic stamp 114 to the piece of electronic correspondence so that the piece of electronic correspondence may be sent to the recipient. In one example, the electronic stamp may have a monetary value. The electronic stamp can be a type of cryptocurrency or may be a token that has the monetary value.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

As an example, the client computing device 102 and the server computing device 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the server computing device 104) may transmit a REST and/or SOAP response formatted using JSON and/or XML.

Figure 2:
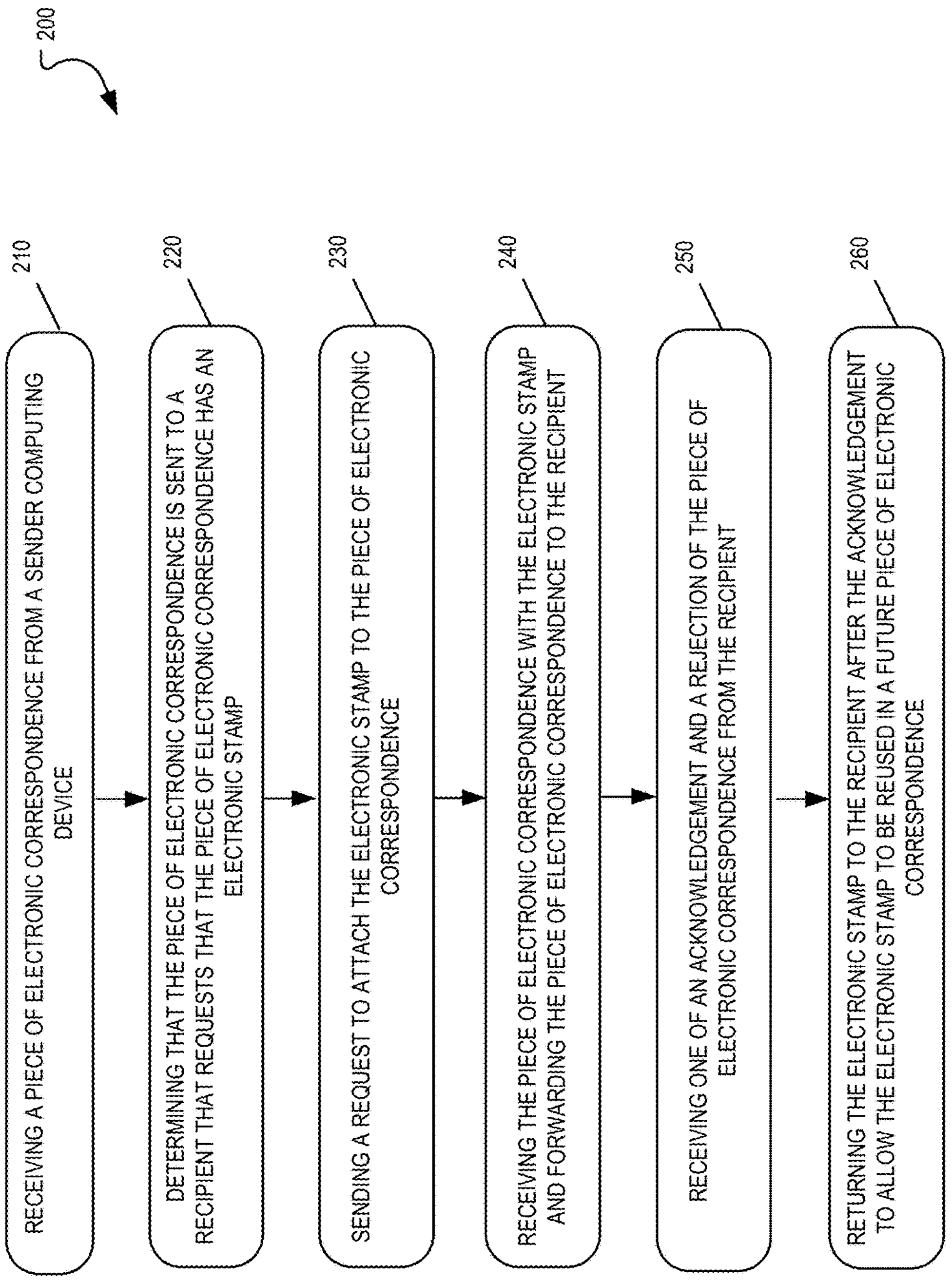
FIG. 2 is a flowchart of a method of sending an electronic correspondence with an electronic stamp according to an example of the instant disclosure.

FIG. 2 illustrates an example method 200 of sending an electronic correspondence with an electronic stamp according to an example of the instant disclosure. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 may include receiving a piece of electronic correspondence from a sender computing device 102 at block 210. In one example, the electronic correspondence may be one of an email message, a text message, a social media message, a voice message, a data message, and a file, among others.

Next, according to some examples, the method 200 may include determining that the piece of electronic correspondence is sent to a recipient that requests that the piece of electronic correspondence has an electronic stamp at block 220.

A first user may request that all electronic correspondence include an electronic stamp. A second user may request that certain types of electronic correspondence include an electronic stamp, e.g., emails. A third user may request that some electronic correspondence from a particular sender or senders, e.g., BigCorp@spam.com, include an electronic stamp. As an example, the request to attach the electronic stamp may indicate a requested monetary value of the electronic stamp and an acceptable electronic stamp format.

Next, according to some examples, the method 200 may include sending a request to attach the electronic stamp to the piece of electronic correspondence to the sender computing device at block 230. In one example, the electronic stamp can have a monetary value. In another example, the electronic stamp may include cryptocurrency having a monetary value. In another example, the electronic stamp may be a token having a monetary value.

Next, according to some examples, the method 200 may include receiving the piece of electronic correspondence with the electronic stamp and forwarding the piece of electronic correspondence to the recipient at block 240.

Next, according to some examples, the method 200 may include receiving one of an acknowledgement and a rejection of the piece of electronic correspondence from the recipient at block 250.

Next, according to some examples, the method 200 may include returning the electronic stamp to the recipient after the acknowledgement to allow the electronic stamp to be reused in a future piece of electronic correspondence at block 260.

According to some examples, the method 200 may include receiving a request for at least one electronic stamp, sending a request for a monetary value for the at least one electronic stamp, issuing the at least one electronic stamp, and sending the at least one electronic stamp to the sender computing device 102.

According to some examples, the method 200 may include receiving the rejection of the piece of correspondence and sending a notification of the rejection to the sender computing device 102.

According to some examples, the method 200 may include receiving the electronic stamp associated with the rejection, generating a monetary value that is less than an original monetary value for the electronic stamp, and sending the monetary value that is less than original monetary value for the electronic stamp to the sender computing device. In another example, the monetary value may be the same as the original monetary value of the electronic stamp.

According to some examples, the method 200 may include a server computing device associated with the recipient sending one of the acknowledgement and the rejection after a period of time. In one example, the server computing device may be a mail server or another type of server.

Figure 3:
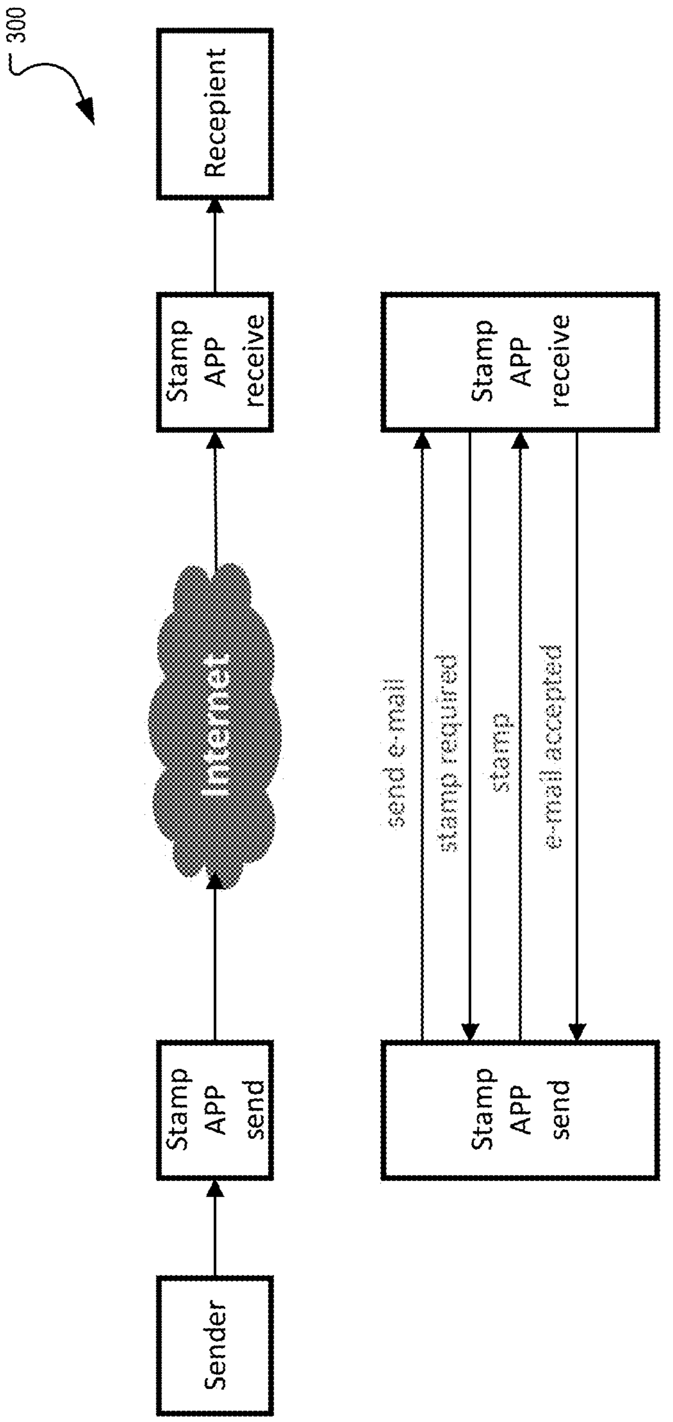
FIG. 3 shows another diagram of the electronic stamp system according to an example of the instant disclosure.

FIG. 3 shows another diagram of the electronic stamp system 100 according to an example of the instant disclosure. As shown in FIG. 3, a sender that may be a sender computing device may send a piece of electronic correspondence. The electronic stamp application 106 may receive and intercept the piece of electronic correspondence and forward the piece of electronic correspondence to a recipient that may be a recipient computing device. In another example, as shown in FIG. 3, the sender may send a piece of electronic correspondence that may be an email. The electronic stamp application 106 may receive and intercept the piece of electronic correspondence and indicate that an electronic stamp is to be added to the email. The sender may add the electronic stamp and resend the email with the electronic stamp. The electronic stamp application 106 may receive the email with the electronic stamp and indicate that the email has been accepted and is to be sent to the recipient for one of acknowledgement or rejection.

Figure 4:
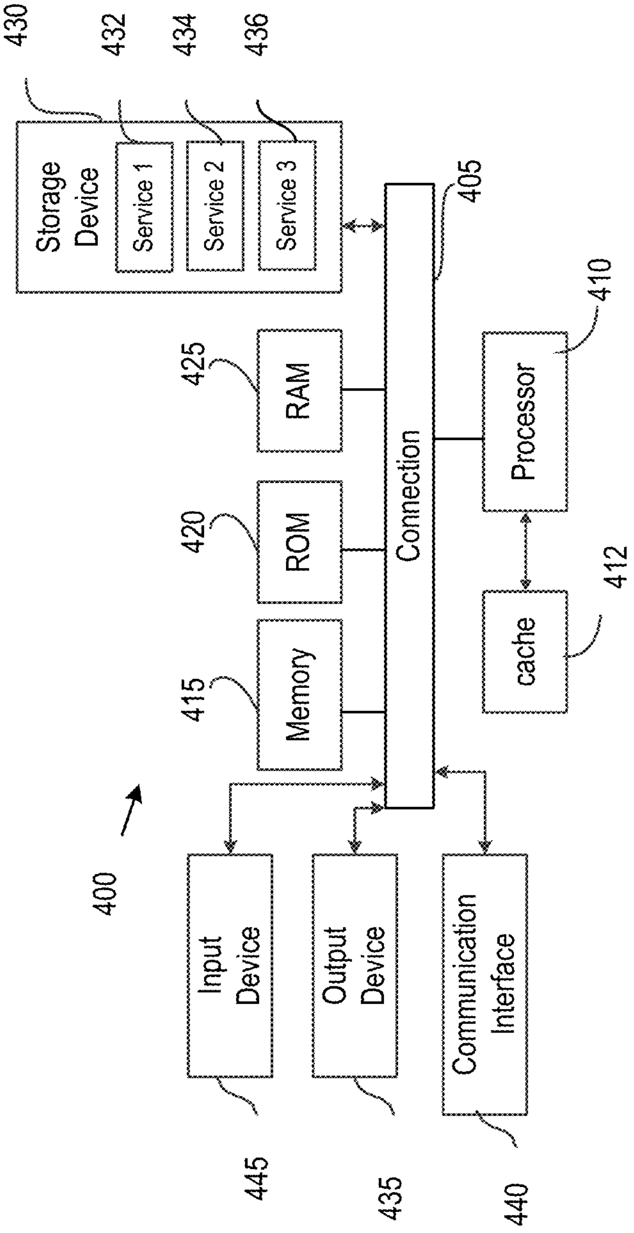
FIG. 4 shows an example of a system for implementing certain aspects of the present technology.

FIG. 4 shows an example of computing system 400, which can be, for example, any computing device making up the computing device such as the client computing device 102, the server computing device 104, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, tablets, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions and at least one processor to execute the instructions to: receive a piece of electronic correspondence from a sender computing device, determine that the piece of electronic correspondence is sent to a recipient that requests that the piece of electronic correspondence has an electronic stamp, send a request to attach the electronic stamp to the piece of electronic correspondence to the sender computing device, receive the piece of electronic correspondence with the electronic stamp and forward the piece of electronic correspondence to the recipient, receive one of an acknowledgement and a rejection of the piece of electronic correspondence from the recipient, and return the electronic stamp to the recipient after the acknowledgement to allow the electronic stamp to be reused in a future piece of electronic correspondence.

Aspect 2: The system of Aspect 1, the at least one processor further to receive a request for at least one electronic stamp, send a request for a monetary value for the at least one electronic stamp, issue the at least one electronic stamp, and send the at least one electronic stamp to the sender computing device.

Aspect 3: The system of Aspects 1 and 2, wherein the electronic stamp has a monetary value.

Aspect 4: The system of Aspects 1 to 3, wherein the electronic stamp comprises cryptocurrency having a monetary value.

Aspect 5: The system of Aspects 1 to 4, wherein the electronic stamp comprises a token having a monetary value.

Aspect 6: The system of Aspects 1 to 5, the at least one processor further to receive the rejection of the piece of correspondence and send a notification of the rejection to the sender computing device.

Aspect 7: The system of Aspects 1 to 6, the at least one processor further to receive the electronic stamp associated with the rejection, generate a monetary value that is less than an original monetary value for the electronic stamp, and send the monetary value that is less than original monetary value for the electronic stamp to the sender computing device.

Aspect 8: The system of Aspects 1 to 7, wherein a server computing device associated with the recipient sends one of the acknowledgement and the rejection after a period of time.

Aspect 9: The system of Aspects 1 to 8, wherein the request to attach the electronic stamp indicates a requested monetary value of the electronic stamp and an acceptable electronic stamp format.

Aspect 10: The system of Aspects 1 to 9, wherein the electronic correspondence comprises one of an email message, a text message, a social media message, a voice message, a data message, and a file.

Aspect 11: A method comprising receiving, by at least one processor, a piece of electronic correspondence from a sender computing device, determining, by the at least one processor, that the piece of electronic correspondence is sent to a recipient that requests that the piece of electronic correspondence has an electronic stamp, sending, by the at least one processor, a request to attach the electronic stamp to the piece of electronic correspondence to the sender computing device, receiving, by the at least one processor, the piece of electronic correspondence with the electronic stamp and forwarding the piece of electronic correspondence to the recipient, receiving, by the at least one processor, one of an acknowledgement and a rejection of the piece of electronic correspondence from the recipient, and returning, by the at least one processor, the electronic stamp to the recipient after the acknowledgement to allow the electronic stamp to be reused in a future piece of electronic correspondence.

Aspect 12: The method of Aspect 11, further comprising receiving a request for at least one electronic stamp, sending a request for a monetary value for the at least one electronic stamp, issuing the at least one electronic stamp, and sending the at least one electronic stamp to the sender computing device.

Aspect 13: The method of Aspects 11 and 12, wherein the electronic stamp has a monetary value.

Aspect 14: The method of Aspects 11 to 13, wherein the electronic stamp comprises cryptocurrency having a monetary value.

Aspect 15: The method of Aspects 11 to 14, wherein the electronic stamp comprises a token having a monetary value.

Aspect 16: The method of Aspects 11 to 15, further comprising receiving the rejection of the piece of correspondence and sending a notification of the rejection to the sender computing device.

Aspect 17: The method of Aspects 11 to 16, further comprising receiving the electronic stamp associated with the rejection, generating a monetary value that is less than an original monetary value for the electronic stamp, and sending the monetary value that is less than original monetary value for the electronic stamp to the sender computing device.

Aspect 18: The method of Aspects 11 to 17, wherein a server computing device associated with the recipient sends one of the acknowledgement and the rejection after a period of time.

Aspect 19: The method of Aspects 11 to 18, wherein the request to attach the electronic stamp indicates a requested monetary value of the electronic stamp and an acceptable electronic stamp format.

Aspect 20: The method of Aspects 11 to 19, wherein the electronic correspondence comprises one of an email message, a text message, a social media message, a voice message, a data message, and a file.

Aspect 21: A non-transitory computer-readable storage medium, having instructions stored thereon that, when executed by at least one processor cause the at least one processor to perform operations, the operations comprising: receiving a piece of electronic correspondence from a sender computing device, determining that the piece of electronic correspondence is sent to a recipient that requests that the piece of electronic correspondence has an electronic stamp, sending a request to attach the electronic stamp to the piece of electronic correspondence to the sender computing device, receiving the piece of electronic correspondence with the electronic stamp and forwarding the piece of electronic correspondence to the recipient, receiving one of an acknowledgement and a rejection of the piece of electronic correspondence from the recipient, and returning the electronic stamp to the recipient after the acknowledgement to allow the electronic stamp to be reused in a future piece of electronic correspondence.

What is claimed is:

1. A system comprising:

a memory storing computer-readable instructions; and at least one processor to execute the instructions to:

receive a piece of electronic correspondence from a sender computing device;

determine that the piece of electronic correspondence is sent to a recipient that requests that the piece of electronic correspondence has an electronic stamp;

send a request to attach the electronic stamp to the piece of electronic correspondence to the sender computing device;

receive the piece of electronic correspondence with the electronic stamp and forward the piece of electronic correspondence to the recipient;

receive one of an acknowledgement and a rejection of the piece of electronic correspondence from the recipient; and return the electronic stamp to the recipient after the acknowledgement to allow the electronic stamp to be reused in a future piece of electronic correspondence.

2. The system of claim 1, the at least one processor further to receive a request for at least one electronic stamp, send a request for a monetary value for the at least one electronic stamp, issue the at least one electronic stamp, and send the at least one electronic stamp to the sender computing device.

3. The system of claim 1, wherein the electronic stamp has a monetary value.

4. The system of claim 1, wherein the electronic stamp comprises cryptocurrency having a monetary value.

5. The system of claim 1, wherein the electronic stamp comprises a token having a monetary value.

6. The system of claim 1, the at least one processor further to receive the rejection of the piece of correspondence and send a notification of the rejection to the sender computing device.

7. The system of claim 6, the at least one processor further to receive the electronic stamp associated with the rejection, generate a monetary value that is less than an original monetary value for the electronic stamp, and send the monetary value that is less than original monetary value for the electronic stamp to the sender computing device.

8. The system of claim 1, wherein a server computing device associated with the recipient sends one of the acknowledgement and the rejection after a period of time.

9. The system of claim 1, wherein the request to attach the electronic stamp indicates a requested monetary value of the electronic stamp and an acceptable electronic stamp format.

10. The system of claim 1, wherein the electronic correspondence comprises one of an email message, a text message, a social media message, a voice message, a data message, and a file.

11. A method, comprising:

receiving, by at least one processor, a piece of electronic correspondence from a sender computing device;

determining, by the at least one processor, that the piece of electronic correspondence is sent to a recipient that requests that the piece of electronic correspondence has an electronic stamp;

sending, by the at least one processor, a request to attach the electronic stamp to the piece of electronic correspondence to the sender computing device;

receiving, by the at least one processor, the piece of electronic correspondence with the electronic stamp and forwarding the piece of electronic correspondence to the recipient;

receiving, by the at least one processor, one of an acknowledgement and a rejection of the piece of electronic correspondence from the recipient; and returning, by the at least one processor, the electronic stamp to the recipient after the acknowledgement to allow the electronic stamp to be reused in a future piece of electronic correspondence.

12. The method of claim 11, further comprising receiving a request for at least one electronic stamp, sending a request for a monetary value for the at least one electronic stamp, issuing the at least one electronic stamp, and sending the at least one electronic stamp to the sender computing device.

13. The method of claim 11, wherein the electronic stamp has a monetary value.

14. The method of claim 11, wherein the electronic stamp comprises cryptocurrency having a monetary value.

15. The method of claim 11, wherein the electronic stamp comprises a token having a monetary value.

16. The method of claim 11, further comprising receiving the rejection of the piece of correspondence and sending a notification of the rejection to the sender computing device.

17. The method of claim 16, further comprising receiving the electronic stamp associated with the rejection, generating a monetary value that is less than an original monetary value for the electronic stamp, and sending the monetary value that is less than original monetary value for the electronic stamp to the sender computing device.

18. The method of claim 11, wherein a server computing device associated with the recipient sends one of the acknowledgement and the rejection after a period of time.

19. The method of claim 11, wherein the request to attach the electronic stamp indicates a requested monetary value of the electronic stamp and an acceptable electronic stamp format.

20. The method of claim 11, wherein the electronic correspondence comprises one of an email message, a text message, a social media message, a voice message, a data message, and a file.

21. A non-transitory computer-readable storage medium, having instructions stored thereon that, when executed by at least one processor cause the at least one processor to perform operations, the operations comprising:

receiving a piece of electronic correspondence from a sender computing device;

determining that the piece of electronic correspondence is sent to a recipient that requests that the piece of electronic correspondence has an electronic stamp;

sending a request to attach the electronic stamp to the piece of electronic correspondence to the sender computing device;

receiving the piece of electronic correspondence with the electronic stamp and forwarding the piece of electronic correspondence to the recipient;

receiving one of an acknowledgement and a rejection of the piece of electronic correspondence from the recipient; and after the acknowledgement is received, allowing the electronic stamp to be either (i) stored by the recipient, or (ii) returned to the sender, based on a choice made by the recipient.

22. The non-transitory computer-readable storage medium of claim 21, wherein the allowing the electronic stamp to be either (i) stored by the recipient, or (ii) returned to the sender further comprises presenting the recipient within an option to store the electronic stamp so that the recipient keeps the electronic stamp instead of returning the electronic stamp to the sender.

* * * * *